(12) United States Patent
Ercan et al.

(10) Patent No.: US 11,726,207 B2
(45) Date of Patent: Aug. 15, 2023

(54) IMAGING DEVICE AND METHOD

(71) Applicant: Sony Semiconductor Solutions Corporation, Kanagawa (JP)

(72) Inventors: Alper Ercan, Stuttgart (DE); Michiel Timmermans, Stuttgart (DE); Ward Van Der Tempel, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 301 days.

(21) Appl. No.: 16/954,180

(22) PCT Filed: Dec. 21, 2018

(86) PCT No.: PCT/EP2018/086736
§ 371 (c)(1),
(2) Date: Jun. 15, 2020

(87) PCT Pub. No.: WO2019/129740
PCT Pub. Date: Jul. 4, 2019

(65) Prior Publication Data
US 2021/0157005 A1    May 27, 2021

(30) Foreign Application Priority Data
Dec. 29, 2017 (EP) .................................. 17211206

(51) Int. Cl.
*G01S 17/36* (2006.01)
*G01S 17/894* (2020.01)
*G01S 7/4915* (2020.01)

(52) U.S. Cl.
CPC .......... *G01S 17/36* (2013.01); *G01S 7/4915* (2013.01); *G01S 17/894* (2020.01)

(58) Field of Classification Search
CPC ....... G01S 17/36; G01S 17/894; G01S 7/4915
USPC ........................................................ 356/5.01
See application file for complete search history.

(56) References Cited

U.S. PATENT DOCUMENTS

| | | |
|---|---|---|
| 6,515,740 B2 | 2/2003 | Bamji et al. |
| 6,580,296 B1 | 6/2003 | Beiu |
| 6,580,496 B2 | 6/2003 | Bamji et al. |
| 7,462,808 B2 | 12/2008 | Lustenberger et al. |
| 9,332,200 B1 | 5/2016 | Hiesh et al. |
| 9,749,565 B2 | 8/2017 | Barnes et al. |
| 2006/0061770 A1 | 3/2006 | Erskine |
| 2006/0176469 A1 | 8/2006 | O'Connor et al. |
| 2008/0106625 A1 | 5/2008 | Border et al. |
| 2014/0049767 A1 | 2/2014 | Benedetti et al. |

(Continued)

FOREIGN PATENT DOCUMENTS

| | | |
|---|---|---|
| EP | 2594959 B1 | 5/2013 |
| KR | 20140057625 A | 5/2014 |

(Continued)

OTHER PUBLICATIONS

International Search Report and Written Opinion for International Application No. PCT/EP2018/086736, dated Mar. 14, 2019.

*Primary Examiner* — Nguyen T Truong
(74) *Attorney, Agent, or Firm* — Wolf, Greenfield & Sacks, P.C.

(57) ABSTRACT

An electronic device comprising circuitry configured to accumulate, in a multiphase exposure, multiple sub-exposures with same phase data in an associated phase memory.

18 Claims, 16 Drawing Sheets

(56) References Cited

U.S. PATENT DOCUMENTS

| | | | |
|---|---|---|---|
| 2014/0375851 A1* | 12/2014 | Lee | H04N 5/335 |
| | | | 348/294 |
| 2016/0344967 A1 | 11/2016 | Barnes | |
| 2017/0122731 A1 | 5/2017 | You et al. | |
| 2018/0168454 A1* | 6/2018 | Ando | A61B 5/0082 |

FOREIGN PATENT DOCUMENTS

| | | |
|---|---|---|
| KR | 20150097379 A | 8/2015 |
| KR | 20170077202 A | 7/2017 |

\* cited by examiner

Frame structure
reset 
exposure 
Fig. 2

IMAGING DEVICE AND METHOD

CROSS-REFERENCE TO RELATED APPLICATIONS

This application claims the benefit under 35 U.S.C. § 371 as a U.S. National Stage Entry of International Application No. PCT/EP2018/086736, filed in the European Patent Office as a Receiving Office on Dec. 21, 2018, which claims priority to European Patent Application 17211206.2, filed in the European Patent Office on Dec. 29, 2017, each of which is hereby incorporated by reference in its entirety.

TECHNICAL FIELD

The present disclosure generally pertains to the field of electronic devices, in particular imaging devices and methods for imaging devices.

TECHNICAL BACKGROUND

In current time of flight (ToF) imaging systems the correlation data required to calculate the depth image is acquired sequentially. A typical number of 4 frames is required to calculate the depth image. The modulator is typically a 2-tap electro-optical modulator so that this system can be described as a "2-tap/4 frame" system.

The key advantage of the "2-tap/4 frame" pixel architecture is that all photo-generated electrons are exploited, instead of dumping one-half of the electrons such as within the 1-tap pixel in which the dumped electrons represent the opposite sampling signal. In the "2-tap/4 frame" pixel architecture the sampling duration is set to half the modulation period: during the first half, all electrons drift to one output, and during the second half all electrons are transferred to the opposite output. That is, the samples are acquired simultaneously. But still, two consecutive exposures need to be performed. That means a "2-tap/4 frame" implementation generates motion artefacts if the objects in the scene are moving fast with respect to the time required for capturing the four frames. The situation becomes worse when the camera itself is moving, for example when mounted on a vehicle or drone.

Previous implementations to tackle the moving camera problem propose, for example, modulators with four taps, where the taps are anticipated to acquire the different correlation data in parallel in a single exposure. However, due to mismatch of the taps in terms of QE (different physical detector) and bandwidth (different tap driver), single exposure depth imaging of a "4-tap/1 frame"-system with similar quality as the standard "2-tap/4 frame"-system is not achievable.

Currently, at least three exposures/frame-reads are needed to construct a depth frame. This imposes bandwidth and memory requirements on the system and limits usability in very dynamic environments, such as fast-moving sensor or scenes, fluctuating ambient light, etc.

SUMMARY

According to a first aspect the disclosure provides an electronic device comprising circuitry configured to accumulate, in a multiphase exposure, multiple sub-exposures with same phase data in an associated phase memory.

According to a further aspect the disclosure provides a method comprising accumulating, in a multiphase exposure, multiple sub-exposures with same phase data in an associated phase memory.

Further aspects are set forth in the dependent claims, the following description and the drawings.

BRIEF DESCRIPTION OF THE DRAWINGS

Embodiments are explained by way of example with respect to the accompanying drawings, in which:

FIG. 2 shows a frame timing diagram including a reset period and an exposure period;
FIGS. 5a-e show an I-Ib exposure phase, a storage phase, and a readout phase;
FIGS. 6a-e show an Q-Qb exposure phase, a storage phase, and a readout phase.

DETAILED DESCRIPTION OF EMBODIMENTS

Figure 1:
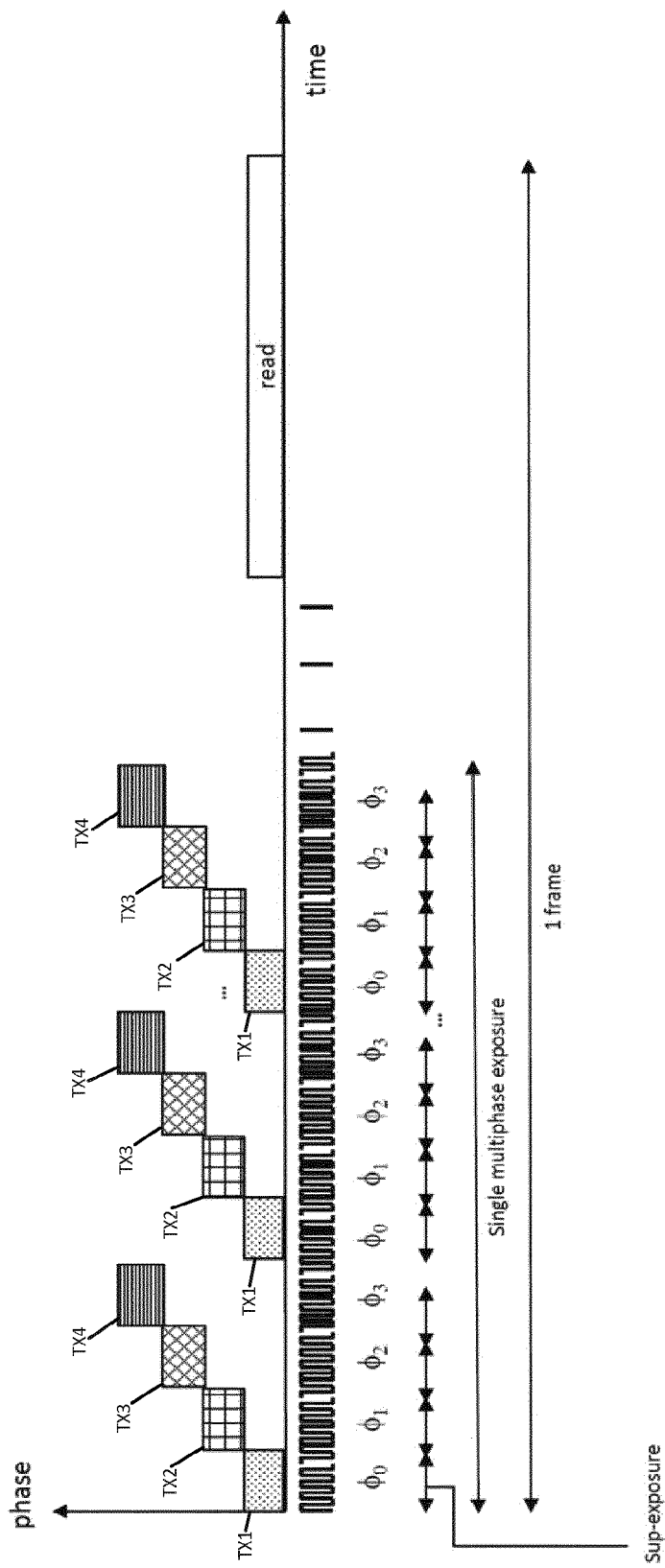
FIG. 1 shows a frame structure for an N-phase TOF pixel.

The embodiments described below in more detail provide an electronic device comprising circuitry configured to accumulate, in a multiphase exposure, multiple sub-exposures with same phase data in an associated phase memory.

The electronic device may for example be an image sensor, e.g. an image sensor of a phase-shift time of flight camera (TOF) depth imaging system. The electronic device may for example be provided in each pixel of an image sensor.

Circuitry may include any electric elements, semiconductor elements, switches, amplifiers, transistors, processing elements, and the like.

A TOF camera uses light pulses for capturing a scene. Illumination is switched on for a short time (exposure) and the resulting light pulse that illuminates the scene is reflected by the objects in the field of view. TOF cameras work by measuring the phase-delay of e.g. reflected infrared (IR) light. Phase data may be the result of a cross correlation of the reflected signal with a reference signal (typically the illumination signal). Phase data may for example comprise four correlation phases, e.g. phase I (0°), phase Q (90°), phase Ib (180°), and phase Qb (270°), where phases Q/Qb exhibit a phase lag of 90° relative to signals I/Ib, respectively, and may be described as being (relatively) in quadrature; hence, and phases I/Ib are not out of phase, i.e., they are in phase.

Each sub-exposure may be associated with one or more specific phases, e.g. phases I, Q, Qb, Ib. A subsequent sub-exposure may have a different phase than the previous sub-exposure. A set of sub-exposures which provides the depth image may for example include four sub-exposures. For example, in a two tap TOF circuitry, four sub-exposures may be foreseen, for example I-Ib, Q-Qb, Ib-I, and Qb-Q, where in a first sub-exposure the first tap receives phase I and the second phase receives phase Ib, in a second sub-exposure the first tap receives phase Q and the second phase receives phase Qb, in a third sub-exposure the first tap receives phase Ib and the second phase receives phase I, and in a third sub-exposure the first tap receives phase Qb and the second phase receives phase Q.

A single pixel of a TOF camera typically comprises one or more photo sensitive elements (e.g. photo diodes). A photo sensitive element converts the incoming light into a current. Switches (e.g. transfer gates) that are connected to the photo diode may direct the current to one or more memory elements (e.g. capacitors) that act as accumulation elements that accumulate and/or store charge.

According to the embodiments, a multiphase exposure comprises multiple sub-exposures. A multiphase exposure may be an exposure which continuously illuminates a scene and continuously detects the light reflected from the scene. For example, a multiphase exposure is not interrupted by read-out phases. The signal accumulated during a multiphase exposure may consist of multiple phases. The sub-exposures may be allocated a set of mix modulation signals which correspond to respective phases and an optical signal. Acquisition of multiple phases in a multiphase exposure may enable to gain a "single exposure" depth image.

The embodiments disclose an N-phase ToF pixel, where N stands for the number of phases ("or correlations") that can be stored in the pixel. According to the embodiments, timing can be more freely chosen. Also, according to the embodiments, motion artefacts may be reduced. The embodiments may use fast readout to increase the Qsat of a depth frame by oversampling.

A phase memory may store the accumulated charge. A phase memory may be any memory element (e.g. a capacitor) that acts as accumulation element for accumulating charge. For example, a capacitor may be a passive two-terminal electrical component that stores electrical energy in an electric field. Capacitance may exist between any two electrical conductors of a circuit in sufficient proximity. A capacitor may specifically be designed to provide and enhance the capacitance effect by consideration of size, shape, and positioning of closely spaced conductors, and the intervening dielectric material. According to some embodiments, also a floating diffusion is used as phase memory.

According to the embodiments, the circuitry may be configured to accumulate, in a multiphase exposure, multiple sub-exposures with same phase data in the associated phase memory. In particular, the circuitry may be configured to accumulate sub-exposures with same phase data by accumulating charge from the sub-exposures with the same phase in a respective phase memory. The circuitry may for example be configured to accumulate phase data with phase data of the same phase from a previous sub-exposure. For example the circuitry may accumulate charge of a specific phase (e.g. I phase) from a specific sub-exposure together with charge of the same phase (also I phase) from a previous sub-exposure.

The circuitry may be configured to readout the accumulated phase at the end of a frame. The imaging data obtained by an imaging sensor is typically read out in data frames. A frame may be defined by a frame structure. For example, a frame may define a multiphase exposure which is divided in multiple sub-exposures and a readout phase. According to the embodiments, the stored phase data, e.g. I, Q, Qb, Ib in the respective phase memories is read out at the end of the frame, instead of reading out the data after each sub-exposure.

According to the embodiments a phase memory may be shared and reused by multiple taps. For example, an electronic device may comprise two taps, each tap receiving a respective phase data during a sub-exposure. The acquired phase data at each the two taps may have for example a phase shift of 180°, e. g. I-Ib, Q-Qb, Ib-I, or Qb-Q. A shared phase memory may accumulate phase data from different taps.

According to the embodiments, the phase data which acquired by a tap may follow the same high frequency path. Following the same high frequency path may result in that the same pixel and the same tap is used associated with the same tap driver and with the same mismatch. The embodiments describe a way to keep operations that are off-set prone common, while enabling a pseudo-parallel correlation data acquisition.

According to the embodiments, each of the taps may comprise an electro-optical modulator tap and phase units, wherein each phase unit comprises a transfer gate, a phase memory, and a readout gate; and the circuitry may further comprise a readout unit, wherein the readout unit comprises a floating diffusion and a readout transistor.

An electro-optic modulator may be an optical device in which a signal-controlled element exhibiting the electro-optic effect is used to modulate a beam of light. The modulation may be imposed on the phase, frequency, amplitude, or polarization of the beam. Modulation bandwidths extending into the gigahertz range are possible with the use of laser-controlled modulators.

A transistor may be a semiconductor device used to amplify or switch electronic signals and electrical power, such as BJT, JFET, IGFET (MOSFET).

A transfer gate is similar to a relay that can conduct in both directions or block by a control signal with almost any voltage potential.

A floating diffusion, also called "sense node" stores charge for readout, e.g. in a photogate pixel sensor. It may for example be a region in an active silicon (diffusion) region of an image sensor electrically isolated from all other nodes. It may for example be a quasi-neutral region isolated by p-n junction from other nodes.

The circuitry may comprise a first tap and a second tap, wherein each tap may comprise a respective mixer, a respective photodetector, and a respective accumulation site. Still further, the circuitry may comprise transfer gates, shared phase memories, a readout gate, a floating diffusion, and an amplifier.

An electronic mixer may be a device that combines two or more electrical or electronic signals into one or two composite output signals.

A photodetector may be a sensor of light or other electromagnetic energy. A photodetector has a p-n junction that converts light photons into current.

The circuitry may be configured to accumulate the phase data in the shared phase memory by circularly rotating the phase data. Circularly rotating phase data may for example comprise shifting charge from one phase memory to another memory, or into accumulation sites. Circularly rotating the phase data may for example be realized by means of controlling transfer gates so that charge is shifted from one phase memory to another.

According to the embodiments, each sub-exposure may comprise an exposure phase, a storage phase, and a rotation phase.

An exposure phase may be a phase, wherein phase data is collected in an accumulation site of a tap.

A storage phase may be a phase wherein a received phase data from an accumulation site is transferred to a respective phase memory and wherein phase data which has a same phase is accumulated.

A rotation phase may be a phase wherein phase data is shifted from one phase memory/accumulation site to another phase memory/accumulation site. A rotation phase may enable accumulating phase data which has a same phase.

The circuitry may further comprise a weighting site for detecting a saturation of the phase memory. Phase data may for example be transferred from a phase memory to a weighting site by means of a transfer transistor, and a detection gate may be provided for detecting saturation of the phase memory.

According to another embodiments, the phase memory may be a floating diffusion. For example, phase data may be transferred from a tap to a floating diffusion. That is, the accumulating, in a multiphase exposure, of multiple sub-exposures with same phase data may happen in a floating diffusion.

If the phase memory is a floating diffusion, the circuitry may comprise a readout unit, wherein the readout unit may comprise a common floating diffusion and a readout transistor. The floating diffusion of a tap can be multiplexed with switches to a common readout floating diffusion (FD), to avoid readout transistor mismatch.

According to another embodiment, a tap may comprise a shared floating diffusion for accumulating phase data. A shared floating diffusion may accumulate phase data of multiple taps.

If the tap comprises a shared floating diffusion, the circuitry may comprise a readout unit, wherein the readout unit comprises a common floating diffusion and a readout transistor.

The embodiments also disclose a method comprising accumulating, in a multiphase exposure, multiple sub-exposures with same phase data in an associated phase memory. The method may comprise any of the processes described above with regard to the operation of an electronic device.

FIG. 1 illustrates an exemplary frame structure of the acquisition of multiple correlation data in a multiphase exposure. A frame comprises a single multiphase exposure. The x-axis represents the time and the y-axis represents the acquisition phase. The single multiphase exposure is divided into a number of sub-exposures TX1, TX2, TX3, TX4. In FIG. 1, three sets of sub-exposures TX1, TX2, TX3, TX4 are shown. The dots in FIG. 1 indicate that there may be other numbers than three sets of sub-exposures TX1, TX2, TX3, TX4. Each set of sub-exposures TX1, TX2, TX3, TX4 is allocated a set of mix modulation signals which correspond to respective phases $\phi_0$, $\phi_1$, $\phi_2$, $\phi_3$, and an optical signal. The resulting correlation information is accumulated and stored in associated phase memories (see PM1, PM2, PM3, PM4 in FIG. 4). In this embodiment, each phase memory may have a frequency of 0.1 to 1 MHz for slow operation such as transfer (TX) operation, or 20-100 MHZ for fast operation such as Current Assisted Photonic Demodulator (CAPD) operation. Instead of reading out data after each exposure, as in the conventional operation method, the data which is gained with the same phase in each sub-exposure is stored in a corresponding phase memory of a tap. The phase memories can be read out ("read" in FIG. 1) and processed into a depth map at the end of the frame. Hence the total readout time can be reduced.

The speed at which the sub-exposures are following each other will determine the motion robustness of the solution. The faster the phase of the modulator and/or illuminator is modulated the more motion-robust the system will be.

For all data which are acquired by a tap the same HF (high-frequency) path may be followed. In other words, the same pixel is used, the same tap is used associated with the same tap driver, with the same mismatch.

FIG. 2 shows an exemplary a timing diagram, which shows that a reset period is provided before the multiphase exposure. In the reset period all phase memories are reset.

[N-Phase TOF Pixel with Shared Phase Memories]

Figure 3:
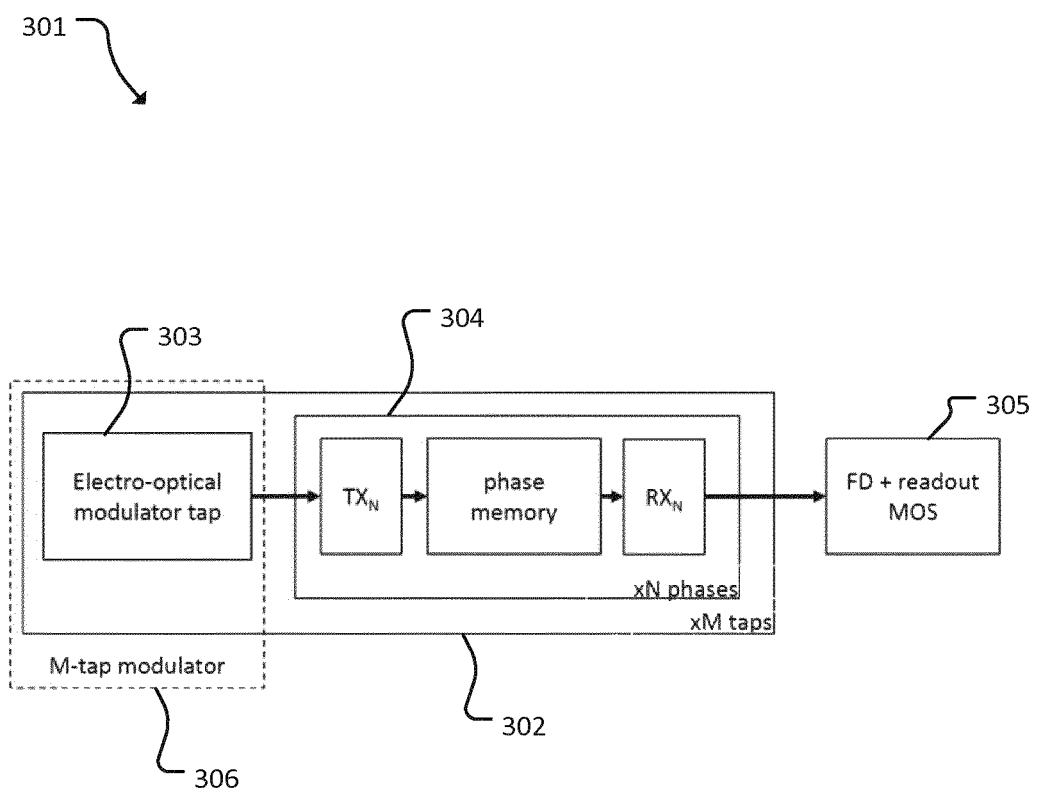
FIG. 3 shows a functional structure of a circuitry for an N-phase TOF pixel with shared phase memories.

FIG. 3 schematically shows an embodiment of a functional structure of a circuitry 301 for an N-phase TOF pixel. The circuitry 301 comprises multiple taps 302 (here a number of M taps), and a readout unit 305. Each tap 302 consists of an electro-optical modulator tap 303 and a phase unit 304 for each phase (there are N phases, but only one phase is shown in FIG. 3). The phase unit 304 has a transfer gate $TX_N$, a phase memory, and a readout gate $RX_N$. The electro-optical modulator tap 303 modulates an electromagnetic wave which is received by an M-tap modulator 306 and generates charge based on the modulated electromagnetic wave. Each tap transfers the collected charge via the transfer gate $TX_N$ to a phase memory. For reading out the stored charge, the charge is transferred through a readout gate $RX_N$ to a readout unit 305 comprising a floating diffusion (FD) and a readout transistor such as a metal-oxide-semiconductor-field-effect transistor (MOS).

Figure 4:
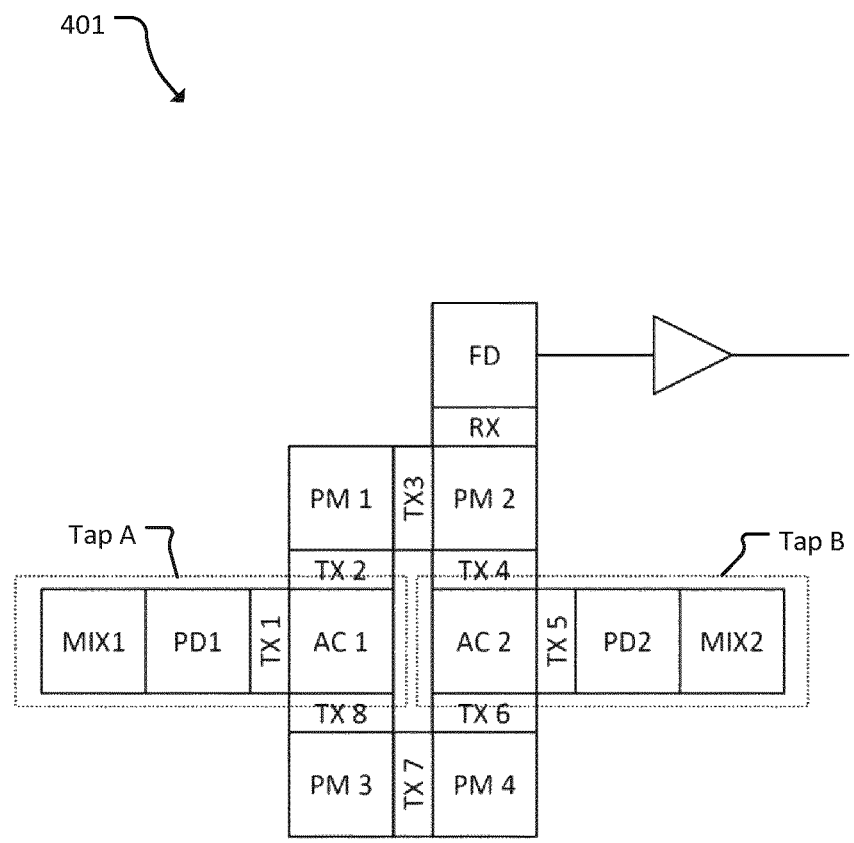
FIG. 4 shows a circular two tap topology with shared phase memories.
Figure 5:
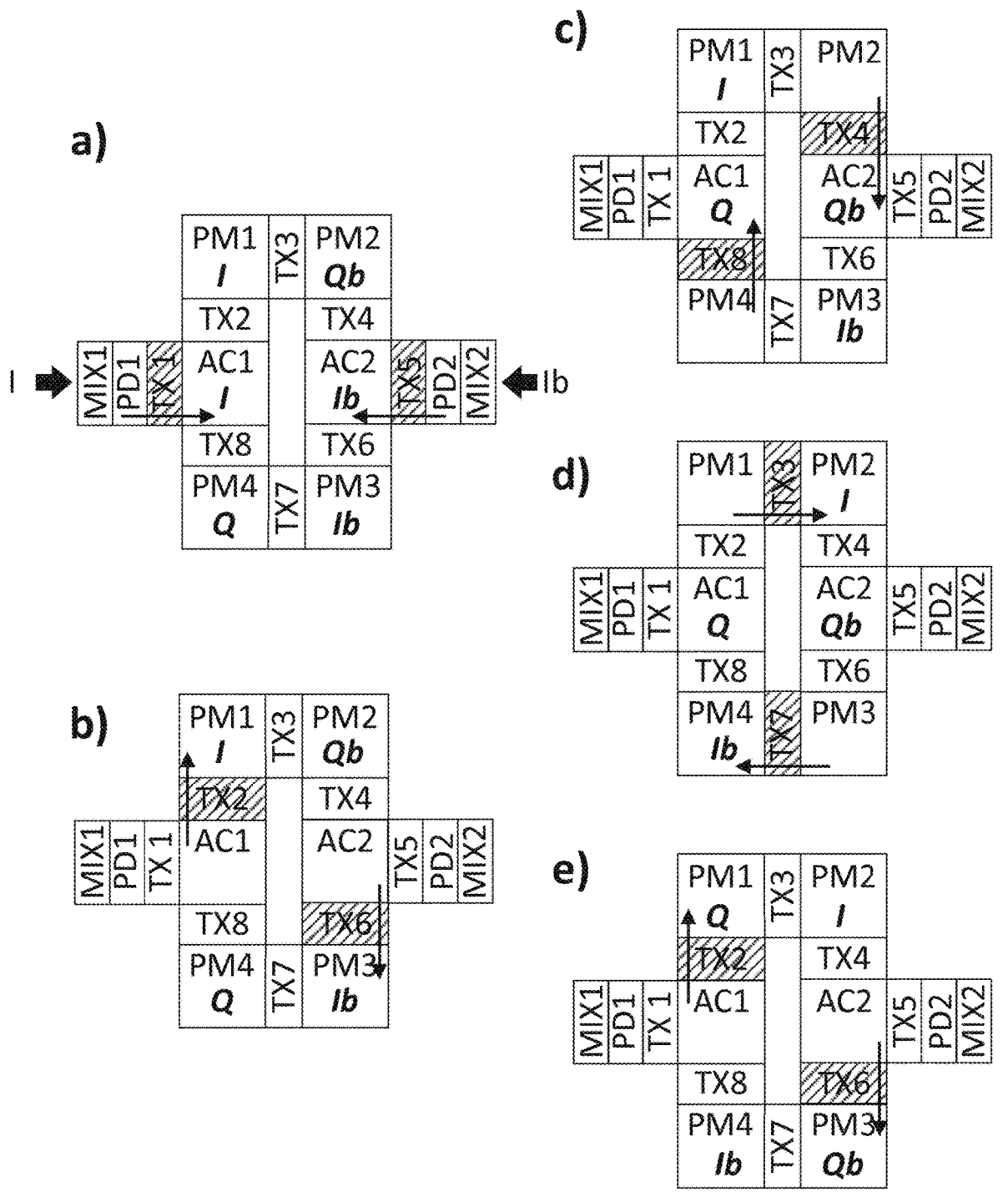
Figure 6:
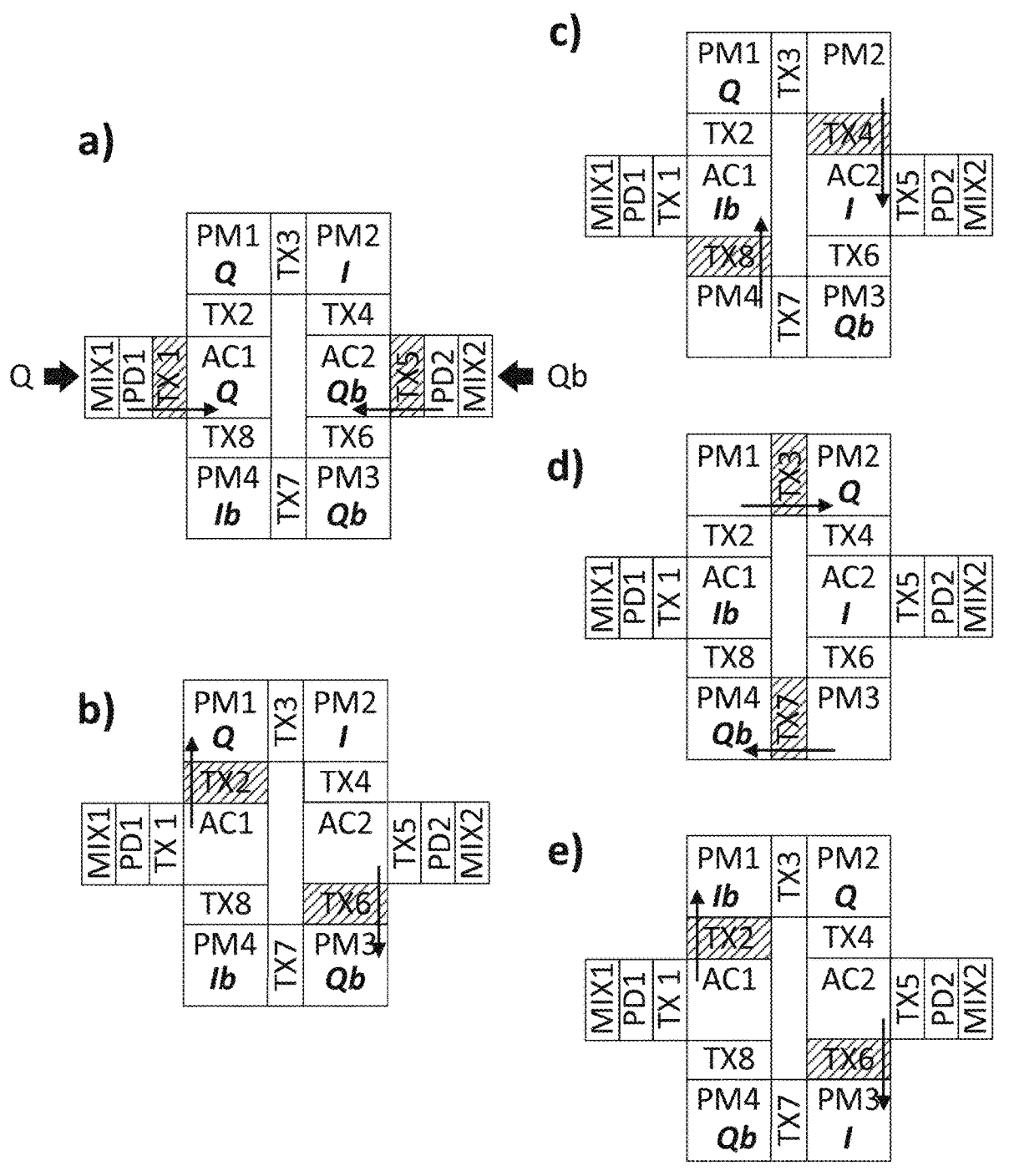
Figure 7:
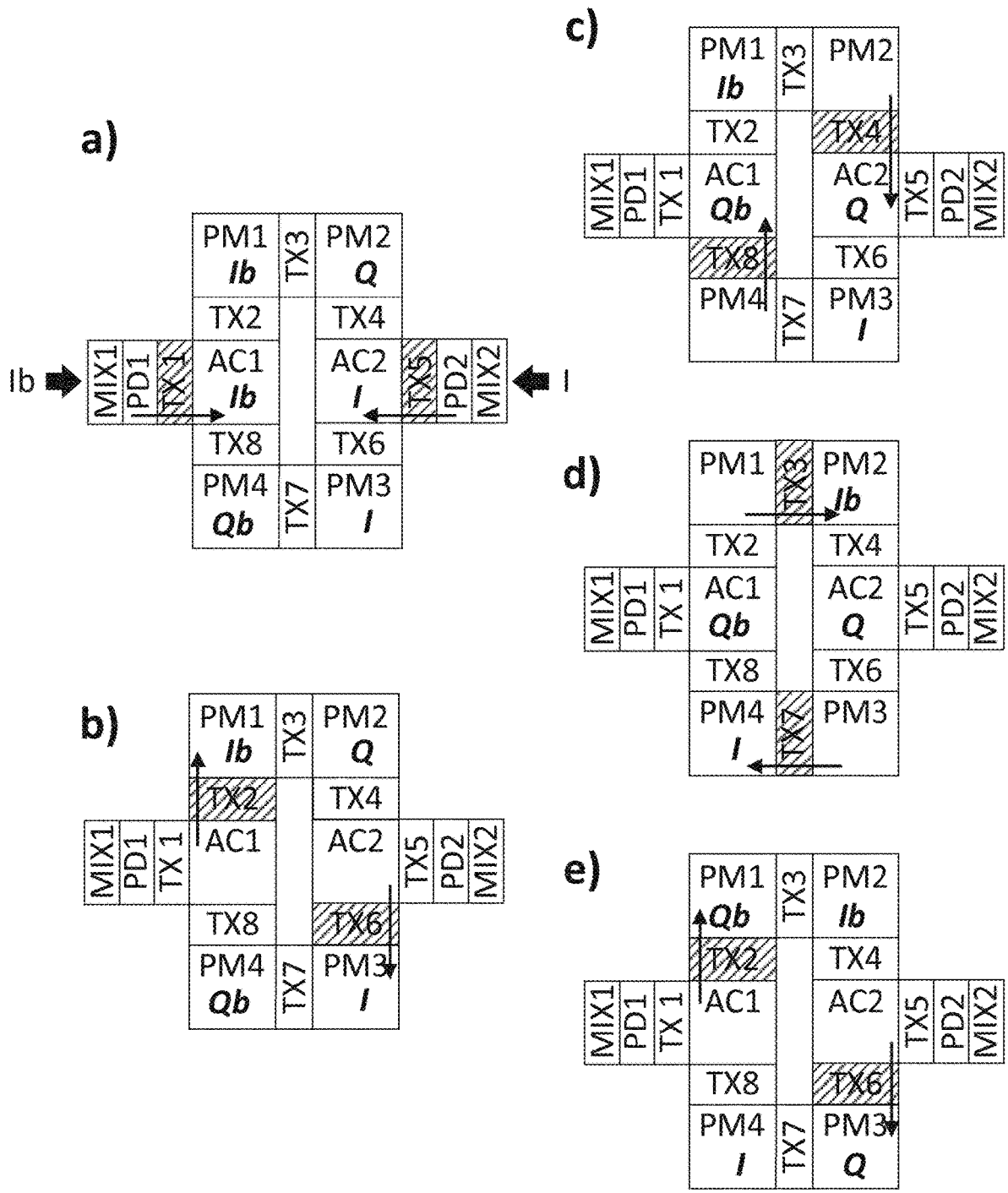
FIGS. 7a-e show an Ib-I exposure phase, a storage phase, and a readout phase.
Figure 8:
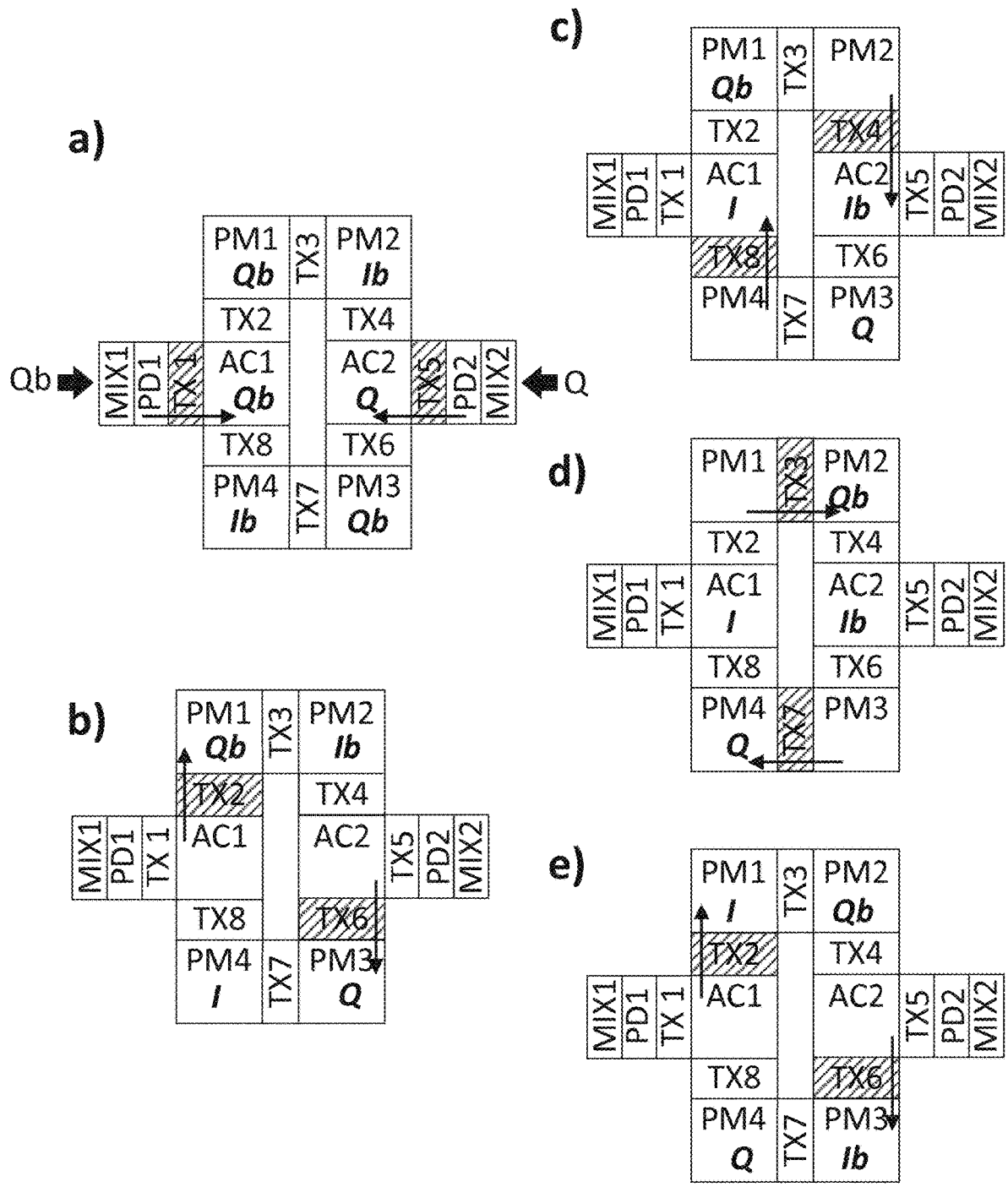
FIGS. 8a-e show an Qb-Q exposure phase, a storage phase, and a readout phase.

FIG. 4 schematically illustrates an exemplary circular two tap topology where phase memories are shared and re-used between the taps. The circular two tap topology 401 includes for each tap, tap A and tap B, a respective mixer MIX1, MIX2, a respective photodetector PD1, PD2, and a respective accumulation site AC1, AC2. The circular two tap topology 401 further comprises eight transfer gates TX1, TX2, TX3, TX4, TX5, TX6, TX7, TX8, four shared phase memories PM1, PM2, PM3, PM4, a readout gate RX, a floating diffusion FD, and an amplifier. Each mixer MIX1, MIX2 modulates an electromagnetic wave and transfers the modulated signal to the respective photodetector PD1, PD2. The photodetectors PD1, PD2 convert the electromagnetic wave to a charge. The charge is then transferred through transfer gates TX1, TX5 to respective accumulation sites AC1, AC2. By activating and deactivating the transfer gates TX1, TX2, TX3, TX4, TX5, TX6, TX7, TX8 it is possible to deliver the charge to the desired phase memories PM1, PM2, PM3, PM4 or to the accumulation sites AC1, AC2. This operation is explained in more detail below (FIGS. 5a-e, 6a-e, 7a-e, 8a-e). The readout gate RX is provided to transfer the charge from the phase memory PM2 to the floating diffusion FD to readout the charge. To amplify the signal a pixel amplifier is additionally provided.

The circular two tap topology 401 where memories are shared, as illustrated in FIG. 4, operates with four correlation phases ($\phi_0$, $\phi_1$, $\phi_2$, $\phi_3$ in FIG. 1), here phase I (0°), phase Q (90°), phase Ib (180°), and phase Qb (270°), for accumulating data. Signals Q/Qb exhibit a phase lag of 90° relative to signals I/Ib, respectively, and are described as being (relatively) in quadrature; hence, labels Q and Qb are used. Signals I/Ib are not out of phase, i.e., they are in phase.

One possibility to accumulate phase data with the same phase in each sub-exposure is to collect charge which has the same phase, and circularly rotate the order of the charge for the next sub-exposure. Each sub-exposure consists of an exposure phase, a storage phase, and a rotation phase.

FIGS. 5a-e to FIG. 8a-e represent exemplary four sub-exposures which are provided to gain a depth image. The four sub-exposure consist of an I-Ib exposure (FIG. 5a), a Q-Qb exposure (FIG. 6a), an Ib-I exposure (FIG. 7a), and a Qb-Q (FIG. 8a) exposure.

FIGS. 5a-e show an I-Ib exposure of an exemplary operation of a two tap topology that shares the same phase memories as described with regard to FIG. 4 above. Transfer gates that are marked by dashes are in activation mode ("open").

FIG. 5a describes an I-Ib exposure phase. It is assumed here that the phase memories PM1, PM2, PM3, and PM4 are occupied with charge from previous sub-exposures. Hence the first phase memory PM1 is occupied with charge which has a phase of I, second phase memory PM2 is occupied charge which has a phase of Qb, third phase memory PM3 is occupied with charge which has a phase of Ib, and fourth phase memory PM4 is occupied with charge which has a phase of Q. In the I-Ib exposure phase, which has an illumination phase of 180°, tap A receives the charge of phase I, and tap B receives the charge of phase Ib. The transfer gates TX1, TX5, which are located between the accumulations sites AC1, AC2, and photodetectors PD1, PD2 are activate. Therefore, in the I-Ib exposure phase, the charge which is obtained through the photodetectors PD1, PD2 is transferred to the accumulation sites AC1, AC2.

FIG. 5b shows a storage phase in which the charge of phases I and Ib obtained in the I-Ib exposure phase is transferred from the accumulation sites AC1, AC2 to respective phase memories PM1 and PM3. Transfer gate TX2 and transfer gate TX6 are activate. Hence, the accumulated charge with phase I at the first accumulation site AC1 is transferred to and stored at the first phase memory PM1, and the accumulated charge with phase Ib at the second accumulation sites AC2 is transferred to and stored at the third phase memory PM3. Hence, the received charge of phase I from tap A is accumulated in phase memory PM1 with charge of phase I of a previous sub-exposure, and the received charge from tap B is accumulated with charge of phase Ib from a previous sub-exposure.

FIGS. 5c, d, e show a first rotation phase. The rotation phase rotates the charge clockwise for allocating the charge to the respective phase memory for the next following exposure and storage phase.

FIG. 5c shows a first step of the rotation phase. In this first step of the rotation phase, transfer gate TX8 and transfer gate TX4 are activate. The second and fourth phase memories PM2, PM4 empty the stored charge which was gained in a previous sub-exposure into accumulation sites AC1, and, respectively, AC2.

FIG. 5d shows a second step of the rotation phase. Transfer gate TX3 which is located between phase memory PM1 and phase memory PM2, and transfer gate TX7 which is located between phase memory PM3 and phase memory PM4, are activate. Hence, the charge I, Ib which was gained in the storage step is transferred from phase memory PM1 to phase memory PM2, and from phase memory PM3 to phase memory PM4.

FIG. 5e shows a third step of the rotation phase. Transfer gate TX2 and the transfer gate TX6 are activate. Hence, the charge Q at the first accumulation site AC1 and the charge Qb at the second accumulation site AC1 is transferred to phase memory PM1, and, respectively, to phase memory PM3.

FIGS. 6a-e shows a second sub-exposure phase of the operation.

FIG. 6a describes a Q-Qb exposure phase. Here it is to notice that the order of the accumulated charge groups I, Ib, Q, Qb in the phase memories PM1, PM2, PM3, PM4 differs with the order as described in FIG. 5, i.e. the order of the charge groups is shifted clockwise. In the Q-Qb exposure phase which has an illumination phase of 90°, tap A receives charge of phase Q, and tap B receives charge of phase Qb. The transfer gates TX1, TX5, which are located between the accumulations sites AC1, AC2, and photodetectors PD1, PD2 are activate. Therefore, in the Q-Qb exposure phase, the charge which is obtained through the photodetectors PD1, PD2 is transferred to the accumulation sites AC1, AC2.

FIG. 6b shows a storage phase in which the charge of phase Q and Qb obtained in the Q-Qb exposure phase is transferred from the accumulation sites AC1, AC2 to respective phase memories PM1 and PM3. Transfer gate TX2 and transfer gate TX6 are activate. Hence, the charge of phase Q which is obtained at the first accumulation site AC1 is accumulated in the charge of phase Q that resulted from the rotation described in FIG. 5, and respectively the charge which is obtained at the second accumulation site AC2 is accumulated with charge of phase Qb.

FIGS. 6c, d, e show a second rotation phase. The rotation phase rotates the charge groups clockwise for allocating the charge group to the respective phase memories for the next following exposure and storage phase.

FIG. 6c shows a first step of the rotation phase. In this first step of the rotation phase, transfer gate TX8 and transfer gate TX4 are activate. Phase memories PM2, PM4 empty the stored charge which was gained in a previous sub-exposure into accumulation sites AC1, and, respectively, AC2.

FIG. 6d shows a second step of the rotation phase. Transfer gate TX3 which is located between the first phase memory PM1 and the second phase memory PM2, and transfer gate TX7 which is located between phase memory PM3 and phase memory PM4, are activate. Hence, the charge Q, and Qb which was gained in the storage step is transferred from phase memory PM1 to phase memory PM2, and, respectively, from phase memory PM3 to phase memory PM4.

FIG. 6e shows a third step of the rotation phase. Transfer gate TX2 and transfer gate TX6 are activate. Hence, the charge Ib at the first accumulation site AC1 and the charge I at the second accumulation site AC1 is transferred to phase memory PM1, and respectively, to phase memory PM3.

FIGS. 7a-e show an Ib-I exposure of the exemplary operation of the two tap topology that shares the same phase memories as described with regard to FIG. 4 above.

FIGS. 8a-e show an Qb-Q exposure of the exemplary operation of the two tap topology that shares the same phase memories as described with regard to FIG. 4 above.

The operation described in FIGS. 7a-e and FIGS. 8a-e follows the same line as with regard to FIGS. 5a-e and 6a-e and a description can thus be omitted. The sequential activation of transfer gates TX1, TX2, TX3, TX4, TX5, TX6, TX7, TX8 is identical as in the operation as mentioned above. The difference in each phase is that the exposure signal and the order of the phase data differs. Further it is to notice at the Ib-I phase, tap A receives phase data Ib and accumulates the phase data to the first phase memory PM1. Hence, the received phase data of tap A is additionally accumulated in the phase memory PM1 where already phase data exists which is obtained from a previous sub-exposure through tap B. To readout the phase data, tap A and B have different phase, preferably a phase shift of 180°. This principle is also applicable for other sub-exposure phases, which is also observable in the sub-exposure phase Qb-Q (FIG. 8a-e).

By sharing phase memories of the taps TAPA, TAPB and rotating charge in a circular manner, charge of similar phase is accumulated in each respective charge group I, Ib, Q, Qb.

After this process, for each pixel, a set of phase measurements is available to calculate the depth information. When reading out the phase information through a unique floating diffusion (FD) per tap or even per pixel, the phase measurements remain consistent and offset in this FD and readout is not an issue as these parameters are removed in the depths calculation. Mismatch of the modulator itself is also removed as each tap has acquired a consistent set of data.

[N-Phase TOF Pixel with Shared Phase Memories and Weighting Site]

Figure 9:
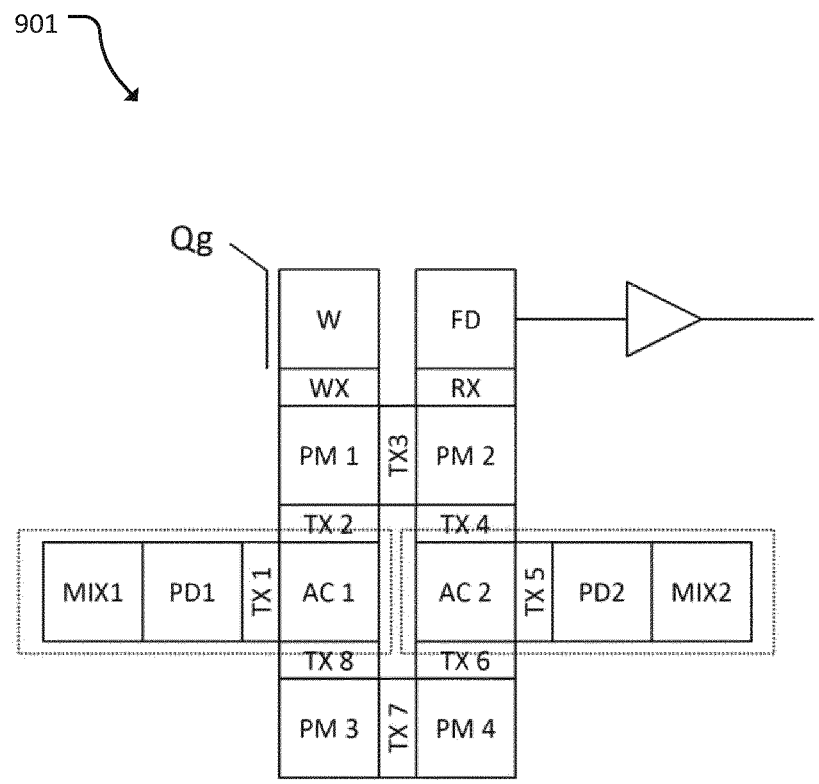
FIG. 9 shows a circular two tap topology with a weighting site.

FIG. 9 schematically illustrates another exemplary circular two tap topology where phase memories are shared and re-used between the taps. This embodiment corresponds to the embodiment of FIG. 4. The circular two tap topology 901 additionally adds a weighting site W, a weighing site transfer transistor WX, and a detection gate Qg to the circular two tap topology 401 which is shown in FIG. 4. The weighing site W with the detection gate is provided for detecting a saturation of phase memory PM1.

[N-Phase TOF Pixel with Floating Diffusions as Phase Memories]

Figure 10:
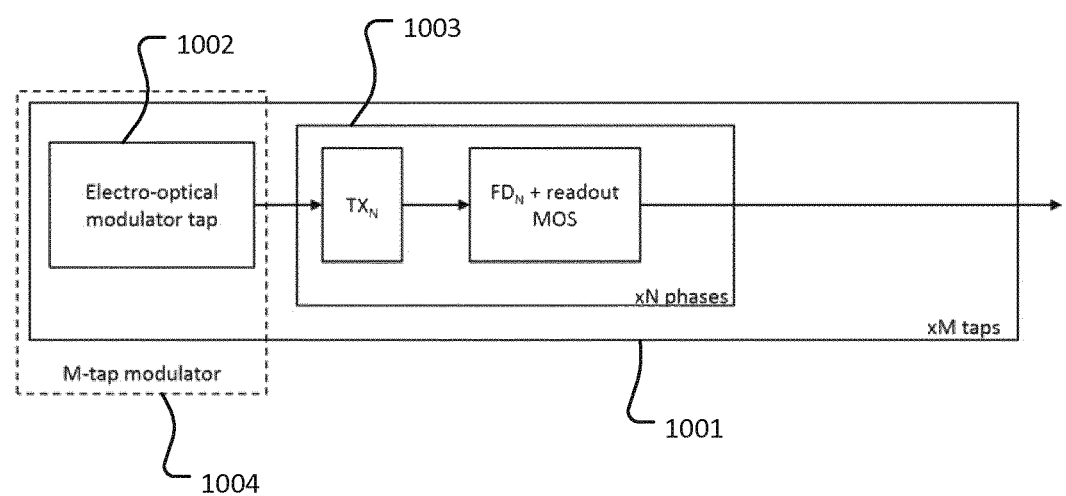
FIG. 10 shows a functional structure of a circuitry for an N-phase TOF pixel with separate memories.

FIG. 10 schematically shows another embodiment of a functional structure of a tap for an N-phase TOF pixel with separate phase memories. Instead of having shared memories, phase data (e.g. I, Ib, Q, Qb) is transferred from each tap to respective floating diffusions $FD_N$ (N being the number of phases). The information of each phase is thus accumulated in separate floating diffusions $FD_N$. This architecture simplifies the pixel structure significantly, however, care must be taken at design to minimize any mismatch between the different floating diffusions $FD_N$. The tap 1001 consists of an electro-optical modulator tap 1002 and a phase unit 1003 for each phase (only one phase is shown in FIG. 3). The phase unit 1003 has a transfer gate TXn, a floating diffusion (FD), and a readout transistor such as a metal-oxide-semiconductor-field-effect transistor (MOS). The electro-optical modulator tap 1002 modulates an electromagnetic wave which is received by an M-tap modulator 1004 and generates charge based on the modulated electromagnetic wave.

Depending on which phase or correlation is acquired, a different memory is used to accumulate the charge.

In the following it is described an example operation in which there are two taps (M=2), four phases (N=4) ($\phi_0$, $\phi_1$, $\phi_2$, $\phi_3$ in FIG. 1), here phase I (0°), phase Q (90°), phase Ib (180°), and phase Qb (270°), and thus four phase memories per tap.

It is assumed that four sub-exposure are required to gain a depth image: I-Ib phase, Q-Qb phase, Ib-I phase, and Qb-Q phase.

In the I-Ib exposure phase, tap A receives the phase data I, and tap B receives the phase data Ib, hence I-Ib exposure has an illumination phase of 180°. The charge of phase I collected by tap A is stored in a phase memory IA, and the charge of phase Ib received by tap B is stored in a phase memory IbB.

In the Q-Qb exposure phase, tap A receives the phase data Q, and tap B receives the phase data Qb, hence Q-Qb exposure has an illumination phase of 90°. The charge collected by tap A of phase Q is stored in phase memory QA, and charge of phase Qb received by tap B is stored in a phase memory QbB.

In the Ib-I exposure phase, tap A receives phase data Ib, and tap B receives phase data I, hence the Ib-I exposure has an illumination phase of 180°. The charge of phase Ib collected by tap A is stored in a phase memory IbA, and the charge of phase I received by tap B is stored in a phase memory IB.

In the Qb-Q exposure phase, tap A receives phase data Qb, and tap B receives phase data Q, hence the Qb-Q exposure has an illumination phase of 90°. The charge of phase Qb collected by tap A is stored in a phase memory QbA, and the charge of phase Q received by tap B is stored in a phase memory QB.

Figure 11:
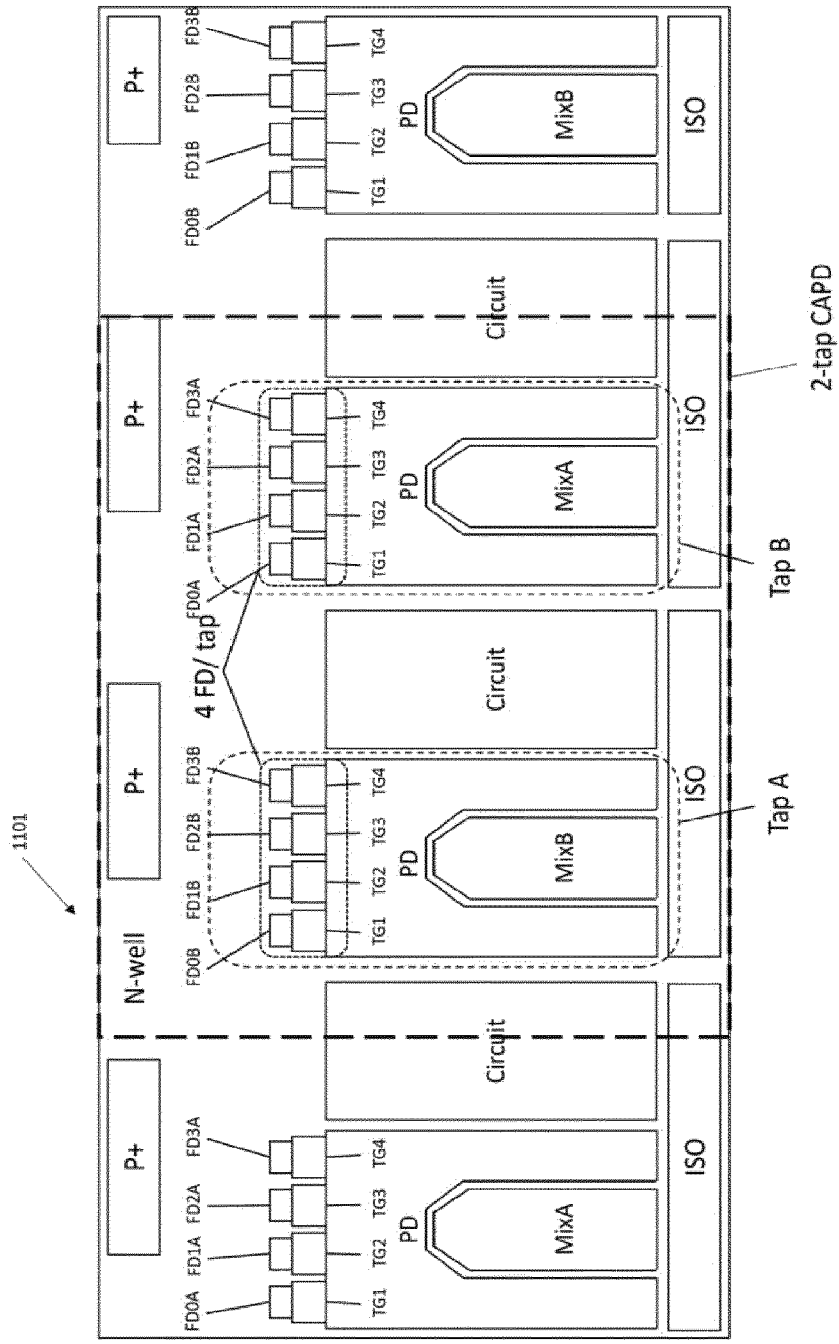
FIG. 11 shows an architecture of a two tap CAPD pixel structure.

FIG. 11 illustrates, as an example, an architecture of a two tap CAPD pixel structure 1101 which is implemented in a semiconductor. The pixel structure includes two taps Tap A, Tap B, circuits, p-type sources, and an n-type well. The circuits control the taps to accumulate phase data or readout phase data. Each tap has a Mixer MixB, MixA, a Photodetector PD, and four floating diffusions per tap, namely FD0A, FD1A, FD2A, and FD3A for tap A and FD0B, FD1B, FD2B, and FD3B for tap B. The distance between the taps may be 5 µm, preferably 7.5 µm, and the height of the taps may be 15 µm. The total length of the two tap CAPD pixel structure may be 15 µm.

Figure 12:
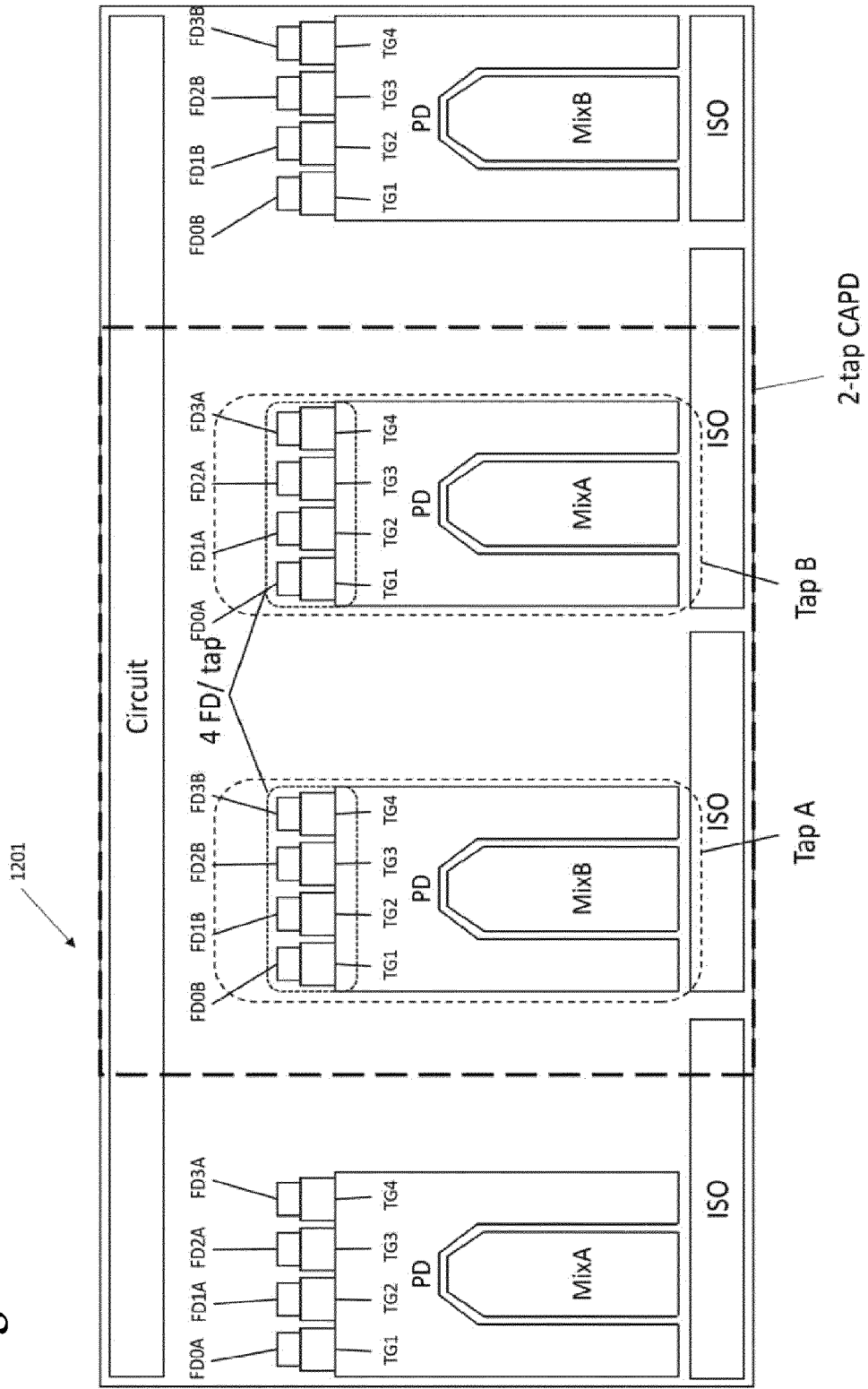
FIG. 12 shows an architecture of a two tap CAPD pixel structure with a common circuit.

FIG. 12 illustrates, as an example, another architecture of a two tap CAPD pixel structure 1201 which is a modification of the above two tap CAPD pixel structure 1101 of FIG. 11. The structure is identical to the pixel structure of FIG. 11 mentioned above, except that the circuits are shared between the taps.

[N-Phase TOF Pixel with a Common Floating Diffusion]

Figure 13:
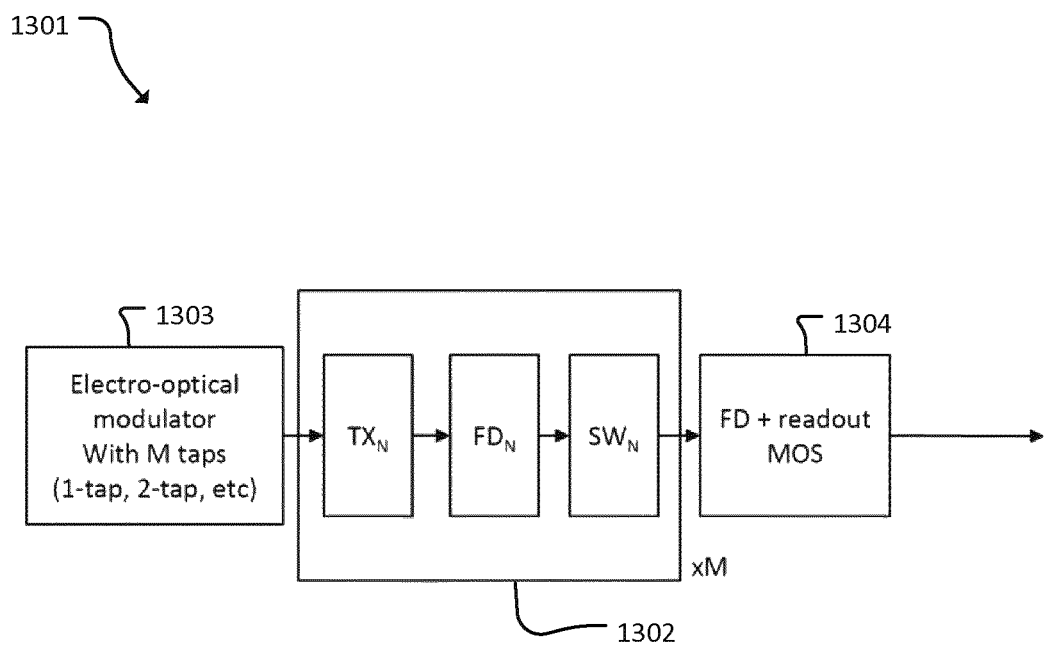
FIG. 13 shows a functional structure of a circuitry for an N-phase TOF pixel with a common floating diffusion.

FIG. 13 schematically shows an embodiment of a functional structure of a circuitry 1301 for an N-phase TOF pixel with a common floating diffusion.

The circuitry 1301 comprises an electro-optical modulator 1303, M taps 1302, and a readout unit 1304. Each tap 1302 consists of N transfer gates $TX_N$ (N: number of phases), N floating diffusions $FD_N$, and N switches $SW_N$. The electro-optical modulator tap 1306 modulates an electromagnetic wave and generates charge based on the modulated electromagnetic wave which are transferred to the floating diffusions $FD_N$ through a transfer gate $TX_N$. The floating diffusions $FD_N$ store the charge. Further, a readout unit 1304 which consists of a common readout floating diffusion FD and a readout transistor MOS obtains the charge of the taps to readout the stored charge. The floating diffusions $FD_N$ are multiplexed with switches $SW_N$ to a common readout floating diffusion FD to avoid readout transistor mismatch.

[N-Phase TOF Pixel with a Shared Floating Diffusion]

Figure 14:
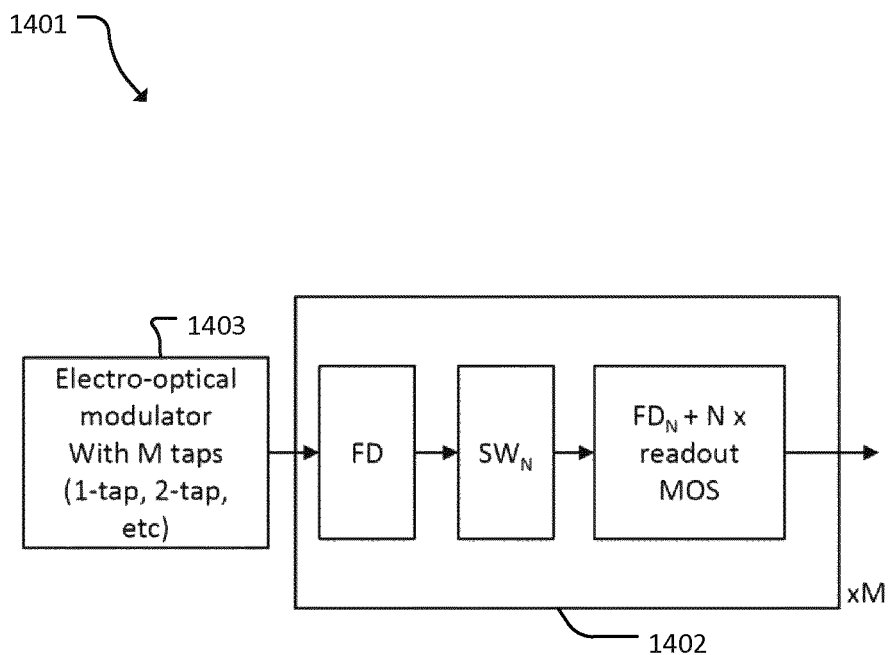
FIG. 14 shows a functional structure of a circuitry for an N-phase TOF pixel with a shared floating diffusion.

FIG. 14 schematically shows another embodiment of a functional structure of a circuitry 1401 for an N-phase TOF pixel with a shared floating diffusion. To further simplify the pixel, instead of working with charge-transfer and transfer gates from tap to storage site, a modulator can be used, where a floating diffusion FD is collecting the charge. The small capacitance of the floating diffusion FD can then be multiplexed to different storage floating diffusions $FD_N$ to create the N-phase memory function. The circuitry 1401 comprises an electro-optical modulator with M taps 1403. Each tap 1402 consists of a shared floating diffusion FD, switches $SW_N$, and readout units 1404 for each phase. Each readout unit 1404 comprises, for each phase N, a floating diffusion $FD_N$ and a readout transistor MOS.

[N-Phase TOF Pixel with a Shared Floating Diffusion and a Common Readout Floating Diffusion]

Figure 15:
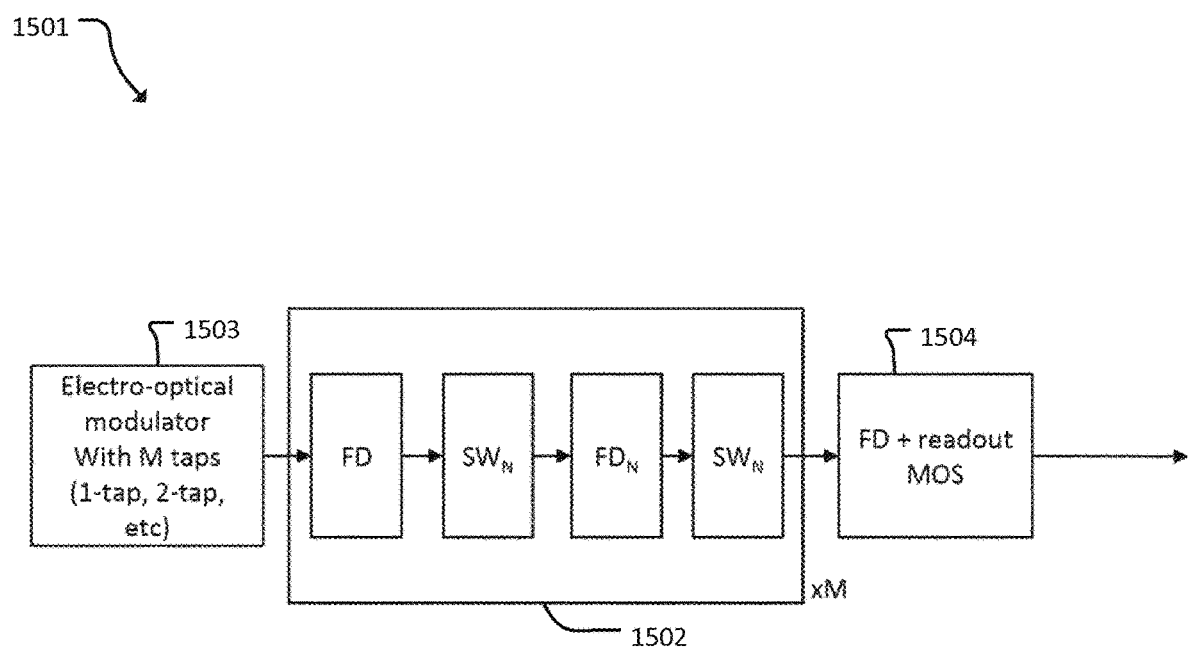
FIG. 15 shows a functional structure of a circuitry for an N-phase TOF pixel with a shared floating diffusion and a common readout floating diffusion.

FIG. 15 schematically shows another embodiment of a functional structure of a circuitry 1501 for an N-phase TOF pixel with a shared floating diffusion and a common readout floating diffusion which is a modification of FIG. 14. The floating diffusions $FD_N$ are multiplexed at readout to a common readout FD to avoid mismatch on the readout path. The circuitry 1501 comprises an electro-optical modulator for M taps 1503, M taps 1502, and a common readout unit 1504. Each tap 1502 consists of a shared floating diffusion FD, and for each phase, a first switch $SW_N$, a storage floating diffusion $FD_N$, and a second switch $SW_N$. The common readout unit 1504 is provided for reading out the signal and comprises a common floating diffusion FD, and a readout transistors MOS. The common readout floating diffusion FD is provided in order to avoid readout transistor mismatch.

[N-Phase TOF Pixel with Separate Memories]

Figure 16:
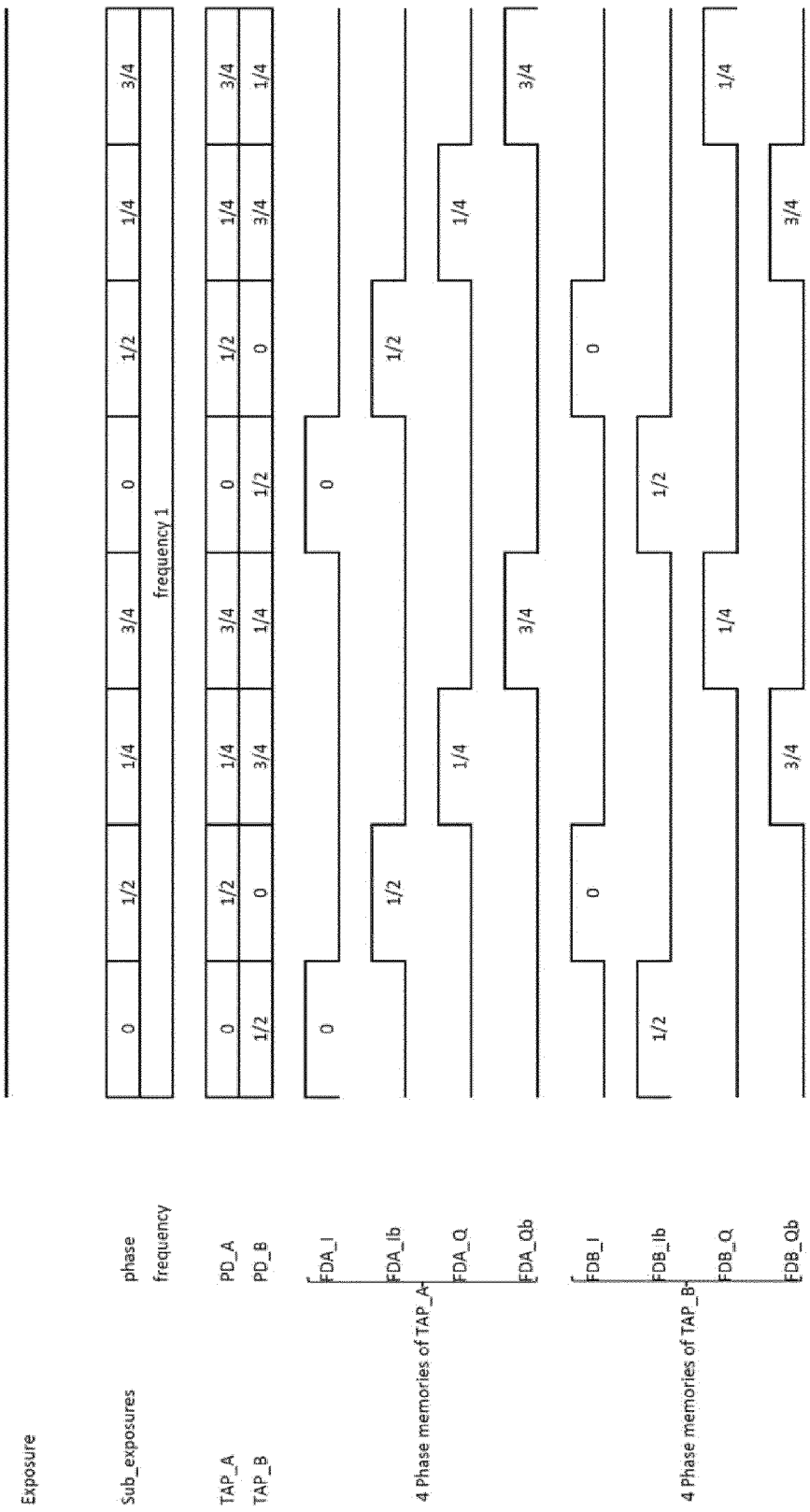
FIG. 16 provides, as a timing diagram, a further embodiment of circuitry that is configured to accumulate, in a multiphase exposure, multiple sub-exposures with same phase data in an associated phase memory.

FIG. 16 provides, as a timing diagram, a further embodiment relating to circuitry that is configured to accumulate, in a multiphase exposure, multiple sub-exposures with same phase data in an associated phase memory. In the section "exposure" of FIG. 16, it is shown a period of time, that corresponds to a multiphase exposure. In the section "sub-exposure" of FIG. 16, it is shown that the multiphase exposure comprises multiple sub-exposures, 0, ½, ¼, ¾, that follow subsequent to one another and which are repeated. The sub-exposures 0, ½, ¼, and ¾ correspond to the phases I, Ib, Q, and Qb, respectively. The circuitry according to this embodiment comprises two taps TAP_A, TAP_B, each tap comprising a photo detector PD A, PD B. The section "TAP_A, TAP_B" of FIG. 16 shows the phases of the respective signal that is produced at each tap at each sub-exposure. The circuitry according to this embodiment comprises four phase memories FDA_I, FDA_Ib, FDA_Q, and FDA_Qb of TAP_A and four phase memories FDB_I, FDB_Ib, FDB_Q, and FDB_Qb of TAP_B. Each phase memory is allocated to a specific phase. The section "4 phase memories of TAP_A; 4 phase memories of TAP_B" of FIG. 16, shows the phases of charge that is stored in the respective phase memories.

It should be recognized that the embodiments describe methods with an exemplary ordering of method steps. The specific ordering of method steps is however given for illustrative purposes only and should not be construed as binding. For example, the order of the sub-exposure phases of FIGS. 5-8 *e* may generally be exchanged. For example, the sub-exposure Q-Qb phase in FIG. 6 and the sub-exposure Ib-I in FIG. 7 may be exchanged. Other changes of the ordering of method steps may be apparent to the skilled person.

All units and entities described in this specification and claimed in the appended claims can, if not stated otherwise, be implemented as integrated circuit logic, for example on a chip.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising circuitry configured to accumulate, in a multiphase exposure, multiple sub-exposures (TX1, TX2, TX3, TX4) with same phase data (I, Q, Qb, Ib) in an associated phase memory (PM1, PM2, PM3, PM4).

(2) The electronic device of (1), wherein the circuitry is configured to accumulate phase data (I, Q, Qb, Ib) with phase data (I, Q, Qb, Ib) of the same phase from a previous sub-exposure (TX1, TX2, TX3, TX4).

(3) The electronic device of (1) or (2), wherein the circuitry is configured to accumulate sub-exposures (TX1, TX2, TX3, TX4) with same phase data (I, Q, Qb, Ib) by accumulating charge in a respective phase memory (PM1, PM2, PM3, PM4).

(4) The electronic device of anyone of (1) to (3), wherein the circuitry is configured to readout the accumulated phase data (I, Q, Qb, Ib) at the end of a frame.

(5) The electronic device of anyone of (1) to (4), wherein the phase memory (PM1, PM2, PM3, PM4) is a shared phase memory.

(6) The electronic device of anyone of (1) to (5), wherein each sub-exposure (TX1, TX2, TX3, TX4) comprises an exposure phase, a storage phase, and a rotation phase.

(7) The electronic device of (5) or (6), wherein the circuitry is configured to accumulate the phase data (I, Q, Qb, Ib) in the shared phase memory (PM1, PM2, PM3, PM4) by circularly rotating the phase data (I, Q, Qb, Ib).

(8) The electronic device of anyone of (1) to (7), wherein the phase data (I, Q, Qb, Ib) which is acquired by a tap follows the same high frequency path.

(9) The electronic device anyone of (1) to (8), wherein each of the taps (tap A, tap B) comprises an electro-optical modulator tap (303) and phase units (304), wherein each phase unit (304) comprises a transfer gate ($TX_N$), a phase memory, and a readout gate ($RX_N$); and the circuitry further comprises a readout unit (305), wherein the readout unit (305) comprises a floating diffusion and a readout transistor.

(10) The electronic device of anyone of (1) to (9), wherein the circuitry comprises a first tap (Tap A) and a second tap (Tap B), wherein each tap comprises a respective mixer (MIX1, MIX2), a respective photodetector (PD1, PD2), and a respective accumulation site (AC1, AC2), and wherein the circuitry further comprises transfer gates (TX1, TX2, TX3, TX4, TX5, TX6, TX7, TX8), shared phase memories (PM1, PM2, PM3, PM4), a readout gate (RX), a floating diffusion (FD), and an amplifier.

(11) The electronic device of anyone of (1) to (10), wherein the circuitry further comprises a weighting site (W) for detecting a saturation of the phase memory (PM1).

(12) The electronic device of anyone of (1) to (11), wherein the phase memory (PM1, PM2, PM3, PM4) is a floating diffusion.

(13) The electronic device of (12), wherein the circuitry further comprises a readout unit (1304; 1504), wherein the readout unit (1304; 1504) comprises a common floating diffusion (FD) and a readout transistor (MOS).

(14) The electronic device of anyone of (1) to (12), the circuitry comprising one or more taps, wherein a tap (1402) comprises a shared floating diffusion ($FD_N$) for accumulating phase data (I, Q, Qb, Ib).

(15) The electronic device of (14), wherein the circuitry further comprises a readout unit (1504), wherein the readout unit (1504) comprises a common floating diffusion (FD) and a readout transistor (MOS).

(16) A method comprising accumulating, in a multiphase exposure, multiple sub-exposures (TX1, TX2, TX3, TX4)

with same phase data (I, Q, Qb, Ib) in an associated phase memory (PM1, PM2, PM3, PM4).

The invention claimed is:

1. An electronic device comprising circuitry configured to accumulate, in a multiphase exposure, first phase data from a first sub-exposure with second phase data which is based on a same correlation phase and is from a second sub-exposure, in an associated phase memory.

2. The electronic device of claim 1, wherein the second sub-exposure is a previous sub-exposure.

3. The electronic device of claim 1, wherein the circuitry is configured to accumulate sub-exposures with phase data based on a same correlation phase by accumulating charge in a respective phase memory.

4. The electronic device of claim 1, wherein the circuitry is configured to readout the accumulated phase data at the end of a frame.

5. The electronic device of claim 1, wherein the associated phase memory is a shared phase memory.

6. The electronic device of claim 5, wherein each sub-exposure comprises an exposure phase, a storage phase, and a rotation phase.

7. The electronic device of claim 5, wherein the circuitry is configured to accumulate the first phase data and the second phase data in the shared phase memory by circularly rotating phase data.

8. The electronic device of claim 5, wherein phase data which is acquired by a tap follows the same high frequency path.

9. The electronic device of claim 5, wherein the circuitry comprises a first tap and a second tap, and wherein each of the taps comprises an electro-optical modulator tap and phase units, wherein each phase unit comprises a transfer gate, a phase memory, and a readout gate; and the circuitry further comprises a readout unit, wherein the readout unit comprises a floating diffusion and a readout transistor.

10. The electronic device of claim 5, wherein the circuitry comprises a first tap and a second tap, wherein each tap comprises a respective mixer, a respective photodetector, and a respective accumulation site, and wherein the circuitry further comprises transfer gates, shared phase memories, a readout gate, a floating diffusion, and an amplifier.

11. The electronic device of claim 1, wherein the circuitry further comprises a weighting site for detecting a saturation of the associated phase memory.

12. The electronic device of claim 1, wherein the associated phase memory is a floating diffusion.

13. The electronic device of claim 12, wherein the circuitry further comprises a readout unit, wherein the readout unit comprises a common floating diffusion and a readout transistor (MOS).

14. The electronic device of claim 1, the circuitry comprising one or more taps, wherein a tap comprises a shared floating diffusion for accumulating phase data.

15. The electronic device of claim 14, wherein the circuitry further comprises a readout unit, wherein the readout unit comprises a common floating diffusion and a readout transistor (MOS).

16. A method comprising accumulating, in a multiphase exposure, first phase data from a first sub-exposure with second phase data which is based on a same correlation phase and is from a second sub-exposure, in an associated phase memory.

17. At least one non-transitory computer-readable medium comprising instructions that, when executed by at least one processing apparatus, perform a method comprising:

accumulating, in a multiphase exposure, first phase data from a first sub-exposure with second phase data, which is based on a same correlation phase and is from a second sub-exposure, in an associated phase memory.

18. The electronic device of claim 1, wherein the electronic device comprises an image sensor of a time of flight camera.

* * * * *